United States Patent
Lenzkes et al.

[11] 3,891,907
[45] June 24, 1975

[54] ACTUATING MECHANISM FOR SLIDING DOORS

[75] Inventors: Dieter Lenzkes, Erlangen; Karl-Heinz Seiler, Salz, both of Germany

[73] Assignee: Siemens Aktiengesellschaft, Munich, Germany

[22] Filed: Nov. 8, 1973

[21] Appl. No.: 413,956

[30] Foreign Application Priority Data
Nov. 14, 1972  Germany............................ 2255780

[52] U.S. Cl. .............. 318/369; 318/124; 318/135; 310/12
[51] Int. Cl. .................................... H02p 3/00
[58] Field of Search .......... 318/687, 135, 124, 369; 310/12

[56] References Cited
UNITED STATES PATENTS

| | | | |
|---|---|---|---|
| 2,323,441 | 7/1943 | Baird | 318/124 |
| 2,958,025 | 10/1960 | Devilliers et al. | 318/135 |
| 3,456,136 | 7/1969 | Pierro | 310/12 |
| 3,462,883 | 8/1969 | Reeks et al. | 318/687 X |
| 3,575,650 | 4/1971 | Fengler | 318/135 |
| 3,594,622 | 7/1971 | Inagaki | 318/135 |
| 3,621,349 | 11/1971 | Reyx | 318/135 |
| 3,699,365 | 10/1972 | Leitgeb | 310/12 |

Primary Examiner—B. Dobeck
Attorney, Agent, or Firm—Kenyon & Kenyon Reilly Carr & Chapin

[57] ABSTRACT

An actuating mechanism for a sliding door driven by a linear motor comprising a slidable bar coupled to the door, for moving the door into closed and open positions, and a dual stator having the stacks thereof disposed on each side of the bar. A three-phase ac and a dc field winding are disposed in the stator for generating a traveling field for moving the sliding bar and a braking field for reducing the velocity of the movement thereof, respectively. The improvement comprises the provision of a first sequential switching means, responsive to movement of the slidable bar, for selectively energizing the dc field winding and generating the braking field as the door is moved from one of its positions to the other by the traveling field. A second sequential switching means, which is responsive to movement of the bar, deenergizes both the ac and dc field windings, and terminates the traveling and braking fields, when the door is moved into its closed and open positions by the bar.

8 Claims, 5 Drawing Figures

ACTUATING MECHANISM FOR SLIDING DOORS

BACKGROUND OF THE INVENTION

1. Field of the Invention

The invention relates generally to actuating mechanisms for sliding doors, and in particular to an improved mechanism for controlling the opening and closing of such doors.

2. Description of the Prior Art

Generally speaking, motor driven sliding doors such as those used in elevators are controlled by actuating mechanisms consisting of an electric motor, a reduction gear, a friction clutch and a power transmission linkage which transmits the motor power to drive the door. Such actuating mechanisms are expensive to fabricate, and it has been found that a significantly more simple door actuating mechanism can be constructed by using a linear motor to drive the door. In such an actuating mechanism, the linear motor comprises a dual stator and a slidable bar disposed between the stacks thereof which is coupled to the sliding door. Field windings disposed in the stator stacks generate traveling and braking fields for moving the bar and the door, and controlling the velocity of movement thereof, respectively. In known sliding door actuating mechanisms, countercurrent braking is generally utilized to reduce the velocity of movement of the sliding door, and, as a result, switches and measuring devices are required to properly apportion the braking force and time and assure proper operation of the door. These systems have the disadvantage that when the door velocity falls below a predetermined value, the countercurrent braking force applied must be terminated and the driving force of the actuating mechanism reapplied. When the velocity of the door exceeds a predetermined value, the same action must be carried out but in reverse order.

SUMMARY OF THE INVENTION

It is an object of the present invention to provide an improved actuating mechanism for sliding doors which overcomes the above-mentioned disadvantages of heretofore known door actuating mechanisms.

This and other objects are achieved by the present invention in an actuating mechanism for a sliding door which includes a linear motor having a slidable bar coupled to the door for moving the door into open and closed positions, and a dual stator having the stacks thereof disposed on each side of the bar in which ac and dc field windings are disposed for generating a traveling field which moves the slidable bar, and a braking field which reduces the velocity of movement thereof, respectively. Means coupled to the field windings energizes each field winding to generate the braking and traveling fields. The improvement of the invention comprises the provision of a first sequential switching means, coupled to the field energizing means, which is responsive to the movement and position of the slidable bar. This first switching means selectively energizes the dc field winding of the mechanism to generate the braking field as the door is moved from one of its positions to the other by the traveling field. A second sequential switching means coupled to the field energizing means is also responsive to movement of the slidable bar, and deenergizes both the ac and dc field windings to terminate the traveling and braking fields when the door is moved by the bar into its closed and open positions.

DETAILED DESCRIPTION

Figure 1:
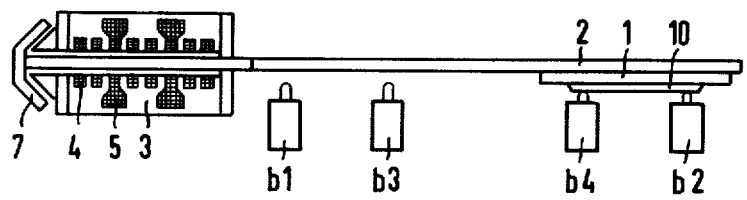
FIG. 1 is a schematic illustration of an improved sliding door actuating mechanism constructed according to the invention.
Figure 1:
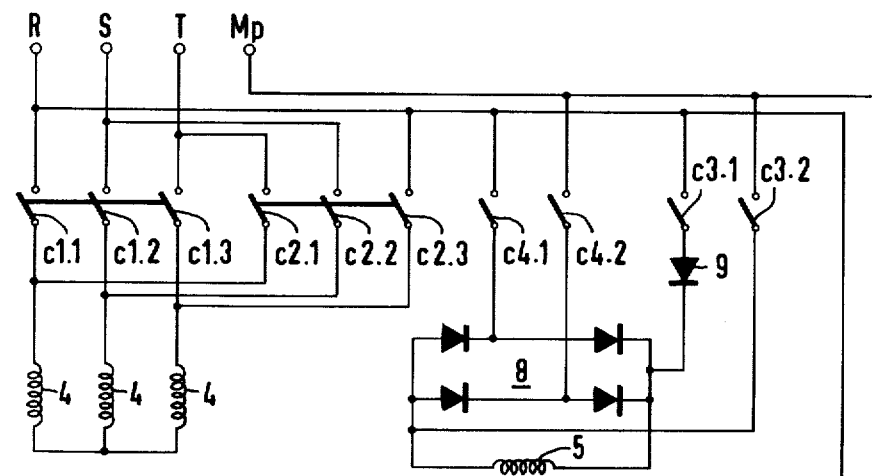

Referring now to the drawings, in particular FIGS. 1 and 3–5, there is shown a sliding door 1 which is coupled to a slidable metallic bar, which may be constructed, for example, of aluminum. The bar is disposed between the stator stacks of a dual stator 3 in which a three-phase ac field winding 4 and a dc field winding 5 are disposed. The dc field winding is disposed in enlarged slots 6 provided in each stator stack which are extensions of the slots thereof in which the three-phase field winding is disposed. The three-phase winding generates a traveling magnetic field which moves sliding bar 2 between the stator stacks. A braking field is generated by the dc field winding for applying a braking force to the bar and reducing the velocity of movement thereof and of the door. The braking force comprises eddy currents which flow through the bar and function as an eddy current brake for both the bar and door. The disposition of the dc field winding in enlargements of the three-phase winding slots, and the spacing of the dc field winding by a distance $S_w$ (see FIG. 4) which is double the pole pitch of the three-phase winding or a multiple factor thereof, assures that the traveling and the braking fields do not interfere with each other. An actuating bar 10 is mounted on door 1 for engaging first and second sequential switching means disposed adjacent thereto, the first sequential switching means comprising switches $b3$ and $b4$, and the second sequential switching means comprising switches $b1$ and $b2$. These switches control the activation of the ac and dc field windings of stator 3 in accordance with the position of the sliding door. A locking armature 7 is mounted on one end of the sliding bar for providing an electromagnetic lock which secures the door in its closed position. When the dc field winding of the actuating mechanism is energized as described later on herein, and the door is in its closed position, the magnetic flux 8 of the field generated by the winding 5 flows through the armature and creates a magnetic locking force for securing the armature, and the sliding bar, in the position illustrated. Armature 7 is designed so as to have an angular shape corresponding to that of a triangular extension 9 integrally formed with stator 3. This particular design causes the air gap between extension 9 and armature 7 to decrease more slowly during the closing of the door and to effect a smoother door closing.

During the opening and closing of the sliding door, the generated traveling and braking fields are superimposed upon one another and automatically adjust the traveling field force required to move the door. The force produced by the traveling field is constant and is almost completely independent of velocity; the braking force magnitude also does not increase in proportion to increasing velocity. The addition of the two forces applied by the traveling and braking fields effectively produces a third resultant force acting on the door whose magnitude declines to zero at a definite door velocity (inching velocity). Energization of the dc field winding to produce the braking field is dependent upon the braking distance required by the resulting force. Thus, in contrast to prior art mechanisms, if the velocity of the sliding door is too great at any point, the braking force applied by the dc field winding predominates. If, however, the door is decelerated to a velocity which is too small in magnitude, such as by frictional forces or intentionally, the traveling field predominates and applies the force produced thereby to move the door to the desired position.

Figure 2:
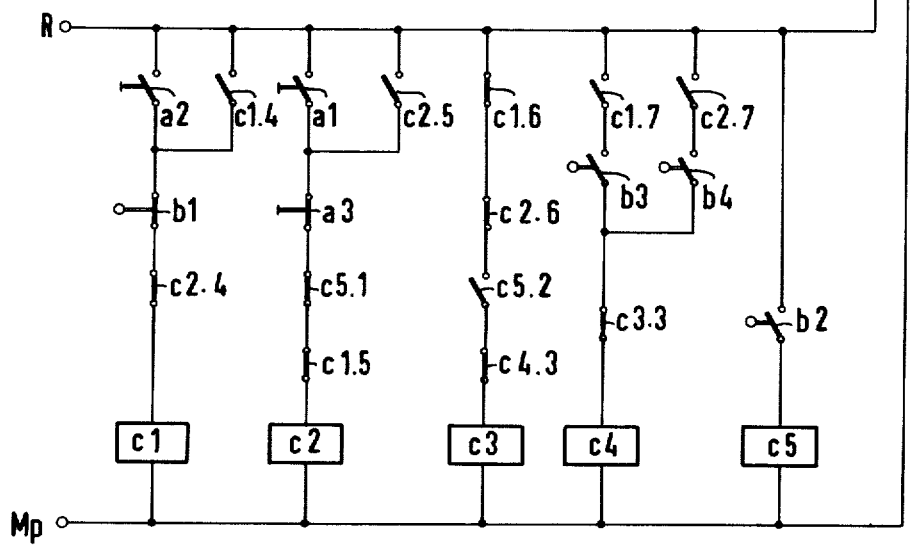
FIG. 2 is an electrical schematic diagram of the actuating mechanism.
Figure 3:
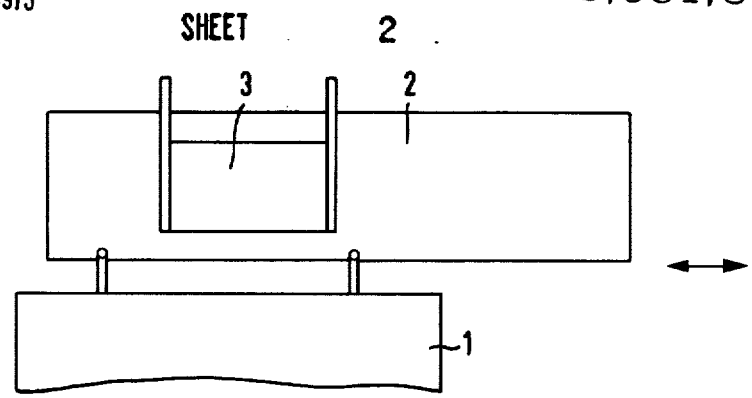
FIG. 3 is a schematic illustration of the linear motor construction showing its connection to a sliding door.
Figure 4:
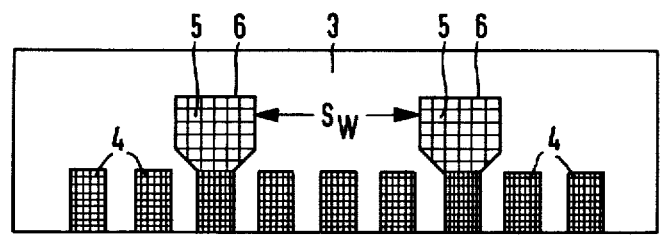
FIG. 4 is a top view of one of the stator stacks of the linear motor of the mechanism.
Figure 5:
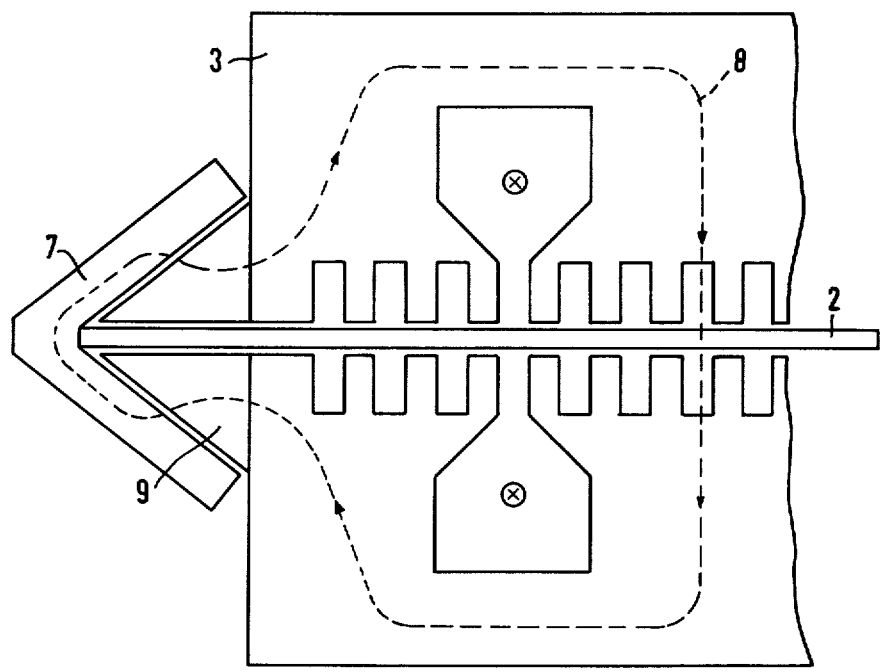
FIG. 5 is a partial top view of another linear motor construction for the actuating mechanism.

As shown in the electrical schematic diagram of FIG. 2, the actuating mechanism includes a plurality of parallel-coupled contactors c1, c2, c3 and c4 which are coupled to three-phase ac field winding 4 and dc field winding 5 by a plurality of main contacts c1.1, c1.2, c1.3, c2.1, c2.2, c2.3, c4.1, c4.2, c3.1 and c3.2. Relay c5 is parallel coupled to the contactors, and controls contacts c5.1 and c5.2 coupled to contactors c2 and c3. Contacts c1.1–c1.3 and c2.1–c2.3 couple a field winding energizing means, illustrated as three-phase ac voltage source terminals R, S and T, to winding 4, whereas contacts c4.1, c4.2 and c3.1, c3.2 couple one three-phase terminal R and a reference potential terminal $M_p$ of the energizing means to winding 5. Auxiliary contacts c2.4, c1.4, c1.5, c5.1, c2.5, c1.6, c2.6, c5.2, c4.3, c1.7, c3.3 and c2.7, in combination with contact switches b1–b4 and a1–a3, couple each contactor and the relay to terminals R and $M_p$ for selectively energizing each of the contactors and the relay. Command switches a1 and a2 may comprise pushbutton control switches; switch a3 is mechanically interconnected to switch a2. The operation of the door actuating mechanism described above is as follows:

When sliding door 1 is in its open position, i.e., when the actuating bar 10 engages switches b1 and b3, contacts c2.4, c5.1, c1.5, c1.6, c2.6, c4.3, c3.3, and switches a3 and b3, are closed, and contacts c1.1, c1.2, c1.3, c2.1, c2.2, c2.3, c4.1, c4.2, c3.1, c3.2, c1.4, c2.5, c5.2, c1.7 and c2.7, and switches a1, a2, b1, b2 and b4, are open. In order to move the door to its closed position, switch a1 is closed. Since switches a3 and a1, and contactors c1.5 and c5.1 are in their closed positions, terminal R is coupled to terminal $M_p$ through contactor c2 and the latter is energized. Contactor c2 closes contacts c2.1, c2.2, c2.3, c2.5 and c2.7, and opens contacts c2.4 and c2.6. Field winding 4 is then coupled to terminals R, S and T, and the traveling field is generated. The sliding door begins to move as the force of the traveling field is applied to bar 2. Contact c2.5, which is coupled in parallel to the command switch a1, functions as a latch when it is closed. Contacts c2.4 and c2.6 are open and prevent activation of contactors c1 and c3. As the door moves towards its closed position, switch b1 is closed, and switch b3 is opened. As the end of the door approaches switch b4, it closes this switch and energizes contactor c4 through switch b4 and contact c2.7. Contactor c4 then closes contacts c4.1 and c4.2 and opens contact c4.3. The closing of the former contacts couples a bridge rectifier 8 and dc field winding 5 to terminals R and $M_p$ to generate the braking field required to decelerate the door. At this time, the generated magnetic fields are superimposed upon one another as previously described. As the door moves further towards its fully closed position, switch b2 is engaged and closed by actuating bar 10 and relay c5 is energized. The relay opens contact c5.1 and closes contact c5.2. The opening of the former contact deenergizes contactor c2 which then opens contacts c2.1, c2.2, and c2.3 to disconnect field winding 4 and terminate generation of the traveling field. Contactor c2 also contacts c2.5 and c2.7, and closes contacts c2.4 and c2.6. The opening of contact c2.7 deenergizes contactor c4, the latter of which then opens contacts c4.1 and c4.2 and closes contact c4.3. Since contacts c1.6, c2.6 and c5.2 are in their closed positions, the closing of contact c4.3 energizes contactor c3 which closes contacts c3.1 and c3.2 and opens contact c3.3. The closing of these contacts couples half-wave rectifier 9 to terminals R and $M_p$ which reduces the current flowing through winding 5 and produces the previously described locking field which flows through armature 7 to secure the sliding door in its closed position.

When the door is stationary in its closed position, contacts c3.1, c3.2, c1.5, c1.6, c2.4, c2.6, c4.3 and c5.2, and switches, b1, b2, b4 and a3 are in their closed positions. Contacts c1.1, c1.2, c1.3, c2.1, c2.2, c2.3, c2.5, c2.7, c4.1, c4.2, c5.1, c1.4, c1.7 and c3.3, and switches a2, a1 and b3 are in their open positions. To open the door, command switch a2 is closed to energize contactor c1 through closed switch b1 and contact c2.4. This contactor closes contacts c1.1, c1.2, c1.3, c1.4 and c1.7, and opens contacts c1.5 and c1.6. Contact c1.4 is coupled in parallel to command switch a2 and also functions as a latch. Since contacts c2.6, c5.2 and c4.2 are closed, the closing of contact c1.6 by contactor c1 energizes contactor c3. This contactor closes contact c3.3 and opens contacts c3.1 and c3.2. Field winding 5 is thereby deenergized and the magnetic force locking the door in its closed position is released. The traveling field generated by field winding 4 then moves the door towards its open position. As the door moves, switch b2 is opened, and relay c5 deenergized. The relay opens contact c5.2 and closes contact c5.1. As the door travels further, switch b4 is opened, and switch b3 is closed. Since, contacts c1.7 and c3.3 are in their closed positions, the closing of switch b3 by actuator bar 10 energizes contactor c4 which then closes contacts c4.1 and c4.2 and opens contact c4.3. Field winding 5 and bridge rectifier 8 are thereby coupled to terminals R and $M_p$ and generate the required braking force to reduce the velocity of movement of the door. As the door continues to move, switch b1 is opened to interrupt the circuit of contactor c1. This contactor then opens contacts c1.1, c1.2, c1.3, c1.4 and c1.7, and closes contacts c1.5 and c1.6. Winding 4 is thereby deenergized and the traveling field terminated. The opening of contact c1.7 also deenergizes contactor c4 which opens contacts c4.1 and c4.2 to deenergize the dc field winding and terminate the braking field, and closes contact c4.3.

In the foregoing description, the invention has been described with reference to specific exemplary embodiments. It will be clear to those persons skilled in the art, however, that various modifications and changes may be made thereunto without departing from the broader scope and spirit of the invention as set forth in the appended claims. The specification and drawing are accordingly to be regarded in an illustrative rather than in a restrictive sense.

What is claimed is:

1. In an actuating mechanism for a sliding door, a linear motor including a slidable bar coupled to the door for moving the door into closed and open positions, a dual stator having the stacks thereof disposed on each side of the bar, ac and dc field windings disposed in the stator, for generating a traveling field for moving the bar and a braking field for reducing the velocity of movement thereof, respectively, and means coupled to the field windings, for energizing the windings and generating said fields, the improvement comprising:

first sequential switching means, coupled to said field winding energizing means and responsive to the movement and position of said slidable bar, including a first pair of contact switches disposed adjacent said door and each other for engaging said door, energizing said dc field winding and generating said braking field as said door is moved from one of said positions to the other by said traveling field; and second sequential switching means, coupled to said field winding energizing means, and responsive to movement of said slidable bar, including a second pair of contact switches disposed adjacent said door and adjacent said first pair of contact switches, said first pair of switches being disposed between said second pair of switches, for engaging said door, deenergizing both said ac and dc field windings and terminating said braking and traveling fields when said door is moved by said bar into its closed and open positions.

2. The mechanism recited in claim 1, further comprising an armature coupled to one end of said bar, said armature being disposed adjacent to said stator of said linear motor when said door is in its closed position, and means coupled to said field winding energizing means and said second sequential switching means, for generating a locking field having a magnitude which is less than that of said braking field, said locking field flowing through said armature and stator and thereby locking said door in its closed position.

3. The mechanism recited in claim 2, wherein said armature is angular in shape, and said stator includes a triangular extension for engagement with said armature when said door is in its closed position.

4. The mechanism recited in claim 2, wherein said means for energizing said field windings comprises a three-phase ac voltage source, and wherein said means for generating said locking field comprises a half-wave rectifier coupled to said voltage source.

5. The mechanism recited in claim 1, wherein said first sequential switching means further comprises a plurality of parallel coupled contactors having the main contacts thereof coupled to said dc field winding, said first pair of contact switches also being coupled to said contactors.

6. The mechanism recited in claim 1, wherein said second sequential switching means further comprises a plurality of parallel coupled contactors having the main contacts thereof coupled to said ac and dc field windings, said second pair of contact switches also being coupled to said contactors.

7. The mechanism recited in claim 1, wherein said means for energizing said field windings comprises a three-phase ac voltage source, and further comprising a bridge rectifier coupled to said voltage source and said dc field winding.

8. The mechanism recited in claim 1, wherein said field windings are disposed in slots provided in said stator, selected ones of said slots having enlarged portions in which said dc field windings is disposed adjacent said ac field winding, and wherein the width of said dc field winding is at least twice the pole pitch of said ac field winding.

* * * * *